(12) United States Patent
Akhmatskaya et al.

(10) Patent No.: US 8,589,127 B2
(45) Date of Patent: Nov. 19, 2013

(54) METHOD, APPARATUS AND COMPUTER PROGRAM FOR MULTIPLE TIME STEPPING SIMULATION OF A THERMODYNAMIC SYSTEM

(75) Inventors: Elena Vitalievna Akhmatskaya, Buckinghamshire (GB); Sebastian Reich, Schielowsee (DE)

(73) Assignee: Fujitsu Limited, Kawasaki (JP)

( * ) Notice: Subject to any disclaimer, the term of this patent is extended or adjusted under 35 U.S.C. 154(b) by 504 days.

(21) Appl. No.: 12/823,590

(22) Filed: Jun. 25, 2010

(65) Prior Publication Data

US 2011/0010145 A1      Jan. 13, 2011

(30) Foreign Application Priority Data

Jul. 9, 2009    (EP) .................................... 09165099

(51) Int. Cl.
*G06F 17/10*      (2006.01)
(52) U.S. Cl.
USPC ............................................................ 703/2
(58) Field of Classification Search
USPC ............................................................ 703/2
See application file for complete search history.

(56) References Cited

PUBLICATIONS

Izaguirre et al.: 'Longer time steps for molecular dynamics' J. Chem. Phys. vol. 110, 1999, pp. 9853-9864.*
Akhmatskaya et al.; New Hybrid Monte Carlo Methods for Efficient Sampling: From Physics to Biology and Statistics Oct. 19, 2010 Joint International Conference on Supercomputing in Nuclear Applications and Monte Carlo 2010 (SNA + MC2010), Tokyo, Japan; pp. 1-16.*
Akhmatskaya et al.; A comparison of generalized hybrid Monte Carlo methods with and without momentum flip; Journal of Computational Physics 228 (2009) pp. 2256-2265.*
Akhmatskaya et al.: 'GSHMC: An efficient method for molecular simulations' J. Comput. Phys. vol. 227, Jan. 2008, pp. 4934-4954.*
List of references from originally filed specification, 1 page.
Extended European Search Report mailed Jan. 11, 2010 for corresponding European Application No. 09165099.4.
J.M. Sanz-Serna, "Mollified Impulse Methods For Highly Oscillatory Differential Equations", Siam Journal on Numerical Analysis 2008 Society for Industrial and Applied Mathematics Publication s US, vol. 46, No. 2, 2008, pp. 1040-1059.
Alistari P. Rendell, "Computational chemistry on Fujitsu vector-parallel processors: Development and performance of applications software", Parallel Computing, Elsevier Publishers, vol. 26, No. 7-8, Jul. 2000, pp. 887-911.

(Continued)

*Primary Examiner* — Hugh Jones
(74) *Attorney, Agent, or Firm* — Staas & Halsey LLP

(57) ABSTRACT

A computer-implemented method of simulating behavior of a thermodynamic system over time, the thermodynamic system having a state described by collective vectors of position and momentum at any given time and the method comprising a momentum refreshment process, a conservative dynamics process, and an acceptance/rejection process, wherein the momentum refreshment process comprises mixing the collective momentum vector with a noise vector; the conservative dynamics process comprises applying a mollified impulse multiple time stepping conservative dynamics method to a current state, in which process calculations for forces corresponding to more slowly varying energy parts in the thermodynamic system undergo an averaging procedure and are carried out at a larger time step than calculations for forces corresponding to more quickly varying energy parts; and wherein the acceptance/rejection process is based on the system energy and comprises accepting a current state or returning a replacement state.

15 Claims, 3 Drawing Sheets

(56) References Cited

PUBLICATIONS

Jin Zhou et al., "Elastic Molecular Dynamics with Self-consistent Flexible Constraints", Journal of Chemical Physics, vol. 112, 7919-7929, Apr. 27, 1999, pp. 1-39.

Jesús A. Izaguirre et al., "Longer time steps for molecular dynamics", Journal of Chemical Physics, vol. 110, No. 20, May 22, 1999, pp. 9853-9864.

A.D. Kennedy et al., "Cost of the generalized hybrid Monte Carlo algorithm for free field theory", Nuclear Physics B 607 [FS], Mar. 21, 2001, pp. 456-510.

Qun Ma et al., "Verlet-I/R-Respa/Impulse is limited by nonlinear instabilities", SIAM Journal on Scientific Computing, vol. 24, No. 6, 2003, pp. 1951-1973.

Richard W. Pastor et al., "An analysis of the accuracy of Langevin and molecular dynamics algorithms", Molecular Physics, 1988, vol. 65, No. 6, pp. 1409-1419.

Tamar Shlick, "Molecular Modeling and Simulation", Springer-Verlag, New York, 2002, 17 pp.

Jesús A. Izaguirre et al., "Langevin Stabilization of Molecular Dynamics", Journal of Chemical Physics, vol. 114, 2090-2098, pp. 1-16, 2001.

Elena Akhmatskaya et al., "GSHMC: An efficient method for molecular simulation", Journal on Computational Physics, vol. 227, No. 10, Jan. 26, 2008, pp. 4934-4954.

Elena Akhmatskaya et al., "A comparison of generalized hybrid Monte Carlo methods with and without momentum flip", Journal of Computational Physics, vol. 228, 2256-2265, 10 pp., Dec. 24, 2008.

Liu, J, "Monte Carlo strategies in scientific computing", Springer-Verlag, New York, 30 pp., 2001.

Allen, M. et al., "Computer Simulation of Liquids", *Brownian Dynamics*, Claredon Press, Oxford, 1987, pp. 257-269.

Darryl D. Humphreys et al., "A Multiple-Time-Step Molecular Dynamics Algorithm for Macromolecules", Journal of Physical Chemistry, vol. 98, 1994, pp. 6885-6892.

Alan M. Horowitz, "A generalized guided Monte Carlo algorithm", Physics Letters B, vol. 268, No. 2, Oct. 10, 1991, pp. 247-252.

Ernst Hairer et al., "Geometric Numerical Integration", Springer-Verlag, Second Edition, 22 pp., 2006.

H. Grumbmüller et al., "Generalized Verlet algorithm for efficient molecular dynamics simulations with long-range interactions", *Molecular Simulation*, 1991, vol. 6, pp. 121-142.

Stephen D. Bond et al., "Molecular dynamics and the accuracy of numerically computed averages", *Acta Numerica*, vol. 16, 2007, pp. 1-65.

* cited by examiner

METHOD, APPARATUS AND COMPUTER PROGRAM FOR MULTIPLE TIME STEPPING SIMULATION OF A THERMODYNAMIC SYSTEM

CROSS-REFERENCE TO RELATED APPLICATION

This application is based upon and claims the benefit of priority from European Patent Application No. 09165099.4 filed on Jul. 9, 2009, the entire contents of which are incorporated herein by reference.

FIELD OF THE INVENTION

The present invention relates to simulation of thermodynamic systems. In such simulations, physical characteristics and changes in the system can be modelled. The invention has applications in the modelling of physical, chemical and biological systems in particular. For example, embodiments of the invention can use an atomistic model to represent simple, complex and even extremely large biomolecular systems such as whole viruses. There are many applications for such simulation, for example in biosciences, material sciences and in public health and medicine.

BACKGROUND OF THE INVENTION

Molecular dynamics (MD) simulations provide invaluable insight into the properties of biomolecular and other complex systems such as macromolecular systems. Some problems that are beyond experiment can only be tackled by simulation. Unfortunately, accurate simulations of macromolecules are often computationally demanding and in many cases are not feasible due to the large number of particles that involve complex and long-range interactions. New approaches and improved computing platforms are needed to enhance the reliability of macromolecular simulations and to approach realistic time frames.

Biological and some other complex systems are multi-scale in nature. For example, the dynamics of proteins contain motions over different time scales, from atomic vibrations in the order of femtoseconds to collective motions at millisecond scales. FIG. 1 depicts the dynamics of molecules such as protein molecules, to illustrate the variation in time scales.

Traditional time stepping integrators (e.g. Verlet) commonly used in molecular dynamics (MD) are not able to address this time scale problem. A typical time-step for these methods is 1 femtosecond. This makes atomistic simulation of biomolecules computationally extremely expensive. Multi-scale numerical methods, in which the presence of fast scales does not affect the time integration of slow scales, are urgently needed for efficient simulation of large biomolecular systems. Such approaches, in theory, can essentially enhance performance of molecular simulation since the most computationally expensive long-range electrostatic interactions contribute to the dynamics on relatively long time scales (compared with internal vibrations) and thus ideally do not need to be calculated frequently. Also, such approaches enhance the data locality which makes them better suited for implementation on parallel computers than traditional MD schemes.

Multiple-time-stepping (MTS) methods are among the most popular methods of this type. In MTS methods, savings of computational time can be realized if the slowly varying forces due to distant interactions are held constant over longer intervals than the more rapidly varying short-range forces. Standard integration procedures in MD can then be modified by evaluating the long-range forces less often than the short-range terms. The ratio between frequencies of evaluation of the long-range forces (outer step-size) and short-range forces (inner step-size) measures the gain in simulation time and will be further referred as "the step-size ratio".

FIG. 2 is a diagramatic explanation of the MTS idea, which splits the forces in a system into bonded "fast" forces and long range non bonded "slow" forces (which tend to be non-linear), evaluating the slow forces less frequently. For this, multiple timestepping integrators are required to solve modified ODEs (ordinary differential equations).

For biomolecular applications, the computational complexity of the fast, short-range force evaluations scales linearly in the number of atoms in the system, N, while it scales quadratically in N for the slow, long-range force evaluations. Furthermore, while the short-range fast forces are easy to compute in parallel, long-range slow forces require global data communication and hence are more difficult to parallelize efficiently. Therefore, in theory, MTS methods can dramatically speed up MD simulations by reducing the number of expensive slow force evaluations.

In practice, however, MTS methods such as the popular Verlet-I/r-RESPA (Grubmüller et al., 1991; Humphreys et al., 1994) suffer from severe resonance instabilities that limit practical performance gain (Ma et al., 2003; Izaguirre et al., 2001). For solvated biomolecular systems, one, for example, has to update expensive slow forces only four times less often than calculating cheap fast forces.

Another problem is that common time-stepping methods do not exactly sample from the target temperature even if the simulations are stable and are subject to a thermostat (Pastor et al., 1988; Bond and Leimkuhler, 2007). The resultant error can be controlled by increasing the frequency of updating slow forces and, in fact, calculating them much more often than required by stability considerations alone. This obviously reduces computational efficiency.

These resonance induced instabilities of impulse MTS methods have been reduced, through the introduction of mollified MTS methods by Izaguirre et al., 1999, giving improved linear stability by defining a slow part of potential energy at a time-averaged position. Further improvements have been achieved by weak coupling to a stochastic heat bath (Langevin dynamics) (Izaguirre et al., 2001). However, accurate simulations still put limits on the step-size ratio which to weaken non-linear instabilities (slow forces) must be in the range of 6-12 for solvated biomolecular systems (Izaguirre et al., 1999, 2001). Moreover, these improved methods can suffer from not reproducing system properties accurately and it may still be necessary to chose simulation parameters very carefully to provide a stable simulation.

It is desirable to provide a method and apparatus for simulation which overcome or at least mitigate some of the disadvantages of the prior art.

STATEMENTS OF THE INVENTION

The invention is defined in the independent claims, to which reference should now be made. Advantageous preferred features are set out in the sub claims.

According to one preferred embodiment of the invention there is provided a computer-implemented method of simulating behaviour of a thermodynamic system over time, the thermodynamic system having potential energy that can be split into more quickly carrying parts and more slowly carrying parts and having a state described by collective vectors of position and momentum at any given time, the method comprising a momentum refreshment process, a conservative dynamics process, and an acceptance/rejection process, wherein the momentum refreshment process comprises mixing the collective momentum vector with a noise vector; wherein the conservative dynamics process comprises applying a mollified impulse multiple time stepping conservative dynamics method to a current state, in which process calculations for forces corresponding to more slowly varying energy parts in the thermodynamic system undergo an averaging procedure and are carried out at a larger time step than calculations for forces corresponding to more quickly varying energy parts; and wherein the acceptance/rejection process is based on the system energy and comprises accepting a current state or returning a replacement state.

The inventors have developed a novel method for constant temperature molecular simulation of large systems, embodiments of which can take advantage of the multi-scale nature of the simulated systems and remove or at least mitigate some of the bottlenecks of existing multi-scale methods.

Embodiments of the invention are referred to as MTS-GHMC (in which GHMC stands for Generalized Hybrid Monte Carlo) and can provide accurate reproduction of thermodynamic and dynamical properties; exact temperature control during simulation; and computational robustness and efficiency.

More specifically, the embodiments of invention allow recognition of a possible use of a Monte Carlo simulation process (that is, a process with some stochastic random input) in an MTS setting, leading to modification of the specific advantageous GHMC method of Akhmatskaya et al., 2009 to provide the desired weak stochastic stabilization for the MD multi-scale integrator to enhance computational performance; and adaptation and implementation of a mollified impulse MTS method in the Molecular Dynamics Monte Carlo (MDMC) step of the GHMC method of Kennedy and Pendleton, 2001; Horowitz, 1991; Akhmatskaya et al., 2009 to eliminate resonance induced instabilities.

The inventors have recognised that the problems in the MTS prior art methods can surprisingly be addressed using a different technique, in which molecular dynamics simulation is interspersed with a momentum refreshment process having a random (noise) element. The molecular dynamics process (also referred to herein as conservative dynamics to highlight that the systems modelled need not necessarily divided into molecules) can be made more efficient by a random momentum refreshment process which can help to start the system development more quickly in a favourable direction. This, combined with the improved linear stability inherent in the technique can allow increases in efficiency by reduction of the frequency of calculation of expensive slow forces, an increase in stability and an increase in accuracy since the additional functionality makes sure that the method rigorously samples from the constant temperature ensemble.

The MTS-GHMC method comprises a momentum refreshment process, a conservative dynamics process and an acceptance/rejection process. The method can begin with either the momentum refreshment process or conservative dynamic process. It might give faster conversion to start the method with a momentum refreshment process. In either case, the resulting state of any process provides the current state for the next process. Advantageously, the acceptance/rejection process is carried out after the conservative dynamics process and there is a single acceptance/rejection process in the method. That is, no acceptance/rejection process is required after the momentum refreshment process.

The acceptance/rejection process itself may comprise any suitable acceptance rejection criterion such as a Metropolis criterion. Preferably, if the system energy satisfies a given condition (for example is effectively lowered) then the results from the conservative dynamics process are accepted. Preferably, if the criterion is not fulfilled, either the result of the momentum refreshment process is accepted or a momentum flip is implemented to provide the accepted state. These two alternatives are suitable for different conditions. The momentum flip alternative is preferred for sampling purposes but can interfere with the dynamics of the underlying Langevin requirements. On the other hand, the momentum flip can improve the acceptance rate. As long as the acceptance rate without the momentum flip does not drop below a certain threshold, the alternative without a momentum flip can improve the accuracy and stability of a time-stepping method without Metropolis correction, for example Langevin dynamics, and can also reproduce dynamical properties faithfully.

The momentum refreshment process may be repeated and the conservative dynamics process is highly likely to be repeated as a multiple iteration process, in which the entire process in question is repeated a number of times consecutively to provide a final resulting state which can be used as a current state for the next process. Usually, the method as a whole is also repeated, for example so that the results of the acceptance/rejection process are fed into the momentum refreshment process in a further iteration of the method.

Any suitable methodology can be used for combining the collective momentum vector with a noise vector in the momentum refreshment process. In one suitable method, the states in the method are denoted by $\Omega_i = (\Gamma_i^T, t_i)^T$, $i = 0, \ldots, I$, where I is a given integer, $\Gamma_i = (X_i^T, P_i^T)^T$, $X_i$ is a collective vector of atomic positions, $P_i$ is a collective vector of atomic momenta, and $t_i$ is time and the momentum refreshment process comprises: given a current state $\Omega_i = (\Gamma_i^T, t_i)^T$, $\Gamma_i = (X_i^T, P_i^T)^T$, mixing its collective atomic momentum vector $P_i$ with an independent and identically distributed normal noise vector $\Xi_i$ of dimension 3N, so that $$\overline{P}_i = \cos(\phi) P_i + \sin(\phi) \Xi_i$$

where i is a given integer, N is the number of particles in the system, $0 < \phi \leq \pi/2$ is a given angle and $\Xi_i \sim \mathcal{N}[0, \beta M^{-1}]$ $\mathcal{N}[0, \beta M^{-1}]$ denotes the (3N)-dimensional normal distribution with zero mean and covariance matrix $\beta M^{-1}$, M is the diagonal mass matrix of the molecular system, and $\beta = 1/k_B T$ is the inverse temperature, the resulting state vector being denoted by $\overline{\Omega}_i = (\overline{\Gamma}_i^T, t_i)^T$, $\overline{\Gamma}_i = (X_i^T, \overline{P}_i^T)^T$.

Turning to the conservative dynamics process, each iteration of the process will usually include describing the forces of the atoms of the molecules of the molecular system using the chosen force field, integrating Newton's equation to predict the positions and velocities and recalculation of the forces.

The multiple time stepping method is carried out so that the calculations for more quickly varying forces (usually those relating to forces over a shorter distance range) are carried out more frequently than calculations for more slowly varying forces. Preferably, the states in the method are denoted by $\overline{\Omega}_i = (\overline{\Gamma}_i^T, t_i)$, $i = 0, \ldots, I$, where I is a given integer, $\overline{\Gamma}_i = (X_i^T, \overline{P}_i^T)^T$, $X_i$ is a collective vector of atomic positions, $\overline{P}_i$ is a collective vector of atomic momenta, and $t_i$ is time and the conservative dynamics process comprises: applying the mollified multiple time stepping method to the current state $\overline{\Omega}_i$ using a time-reversible and volume conserving mapping $\Psi_\tau$, $\tau = L\Delta t$, in $\Gamma = (X^T, \overline{P}^T)^T$ and a resulting state defined by $$\hat{\Omega}_i(\hat{\Gamma}_i^T, t_i + \tau)^T, \hat{\Gamma}_i = \Psi_\tau(\overline{\Gamma}_i),$$

where $L > 0$ is a given integer and $\Delta t$ is the larger time step.

The mollified multiple time stepping method is effectively a method which includes averaging to overcome linear instabilities. This can be carried out by applying a method as set out above, wherein the mollified multiple time stepping method applies an operator A to a collective position vector X and derives mollified slowly varying potential energy $U_{molly}^{slow}$ related to the slowly varying potential energy and yields $F_{molly}^{slow}$ wherein, preferably:

$$M\frac{d^2}{dt^2}X(t) = \sum_{m=0}^{L} c_m \Delta t \delta_x(t - m\Delta t) F_{molly}^{slow}(X(t)) + \sum_{n=0}^{pL} d_n \delta t \delta_x(t - n\delta t) F^{fast}(X(t)),$$

for $t \in [0, t' = L\Delta t]$ with the slow forces defined by $$F_{molly}^{slow}(X) = -\Delta U_{molly}^{slow}(X) = A_X(X)^T F^{slow}(A(X)),$$

where M is a diagonal mass matrix of atomic masses, $A_X(X)$ denotes the Jacobian matrix of partial derivatives, the larger time-step for more slowly varying forces $F^{slow}$ is $\Delta t$, the smaller time-step for more quickly varying forces is $F^{fast}$ is $\delta t$, $\delta_x$ is the Dirac delta function, $c_m = d_n = 1$ except when m=n=0 or m=L, n=pL, respectively, in which case $c_m = d_n = \frac{1}{2}$, and integer p>1.

Accordingly, the acceptance criterion also relates to mollified values and preferably, the acceptance/rejection process comprises testing a current state to find the next accepted state $\Omega_{i+1}$ using a Metropolis accept/reject criterion $$\Omega_{i+1} = \begin{cases} \hat{\Omega}_i & \text{with probability } \min(1, \exp(-\beta \Delta H_{molly})) \\ \overline{\Omega}_i^{\pm} & \text{otherwise,} \end{cases}$$

with $$\Delta H_{molly} := H_{molly}(\hat{\Gamma}_i) - H_{molly}(\Gamma_i),$$

in which $\overline{\Omega}_i^-$ indicates applying a momentum flip to the state $\overline{\Omega}_i$ and $\overline{\Omega}_i^+ = \overline{\Omega}_i$ and indicates that no momentum flip has been applied.

Since mollified terms are used, the calculated properties are preferably recalculated at the end of the entire method (that is after all the iterations of the full method) to allow for the use of mollified terms.

In order to use the method on a computer initial conditions and parameters need to be entered by manually or automatically. Thus the method preferably includes a step of initially accepting input of simulation conditions, wherein the simulation conditions include at least one of volume, mass, temperature, pressure, number of particles, and total energy; and/or a step of initially accepting input of simulation parameters, wherein the simulation parameters include at least one of a number of repetitions of the momentum refreshment process and a number of repetitions of the conservative dynamics process, the larger and smaller time steps in conservative dynamics, the number of iterations of the entire method, the current state for the first step in the method, the force field parameters, a time-reversible and volume conserving mapping $\Psi_\tau$, and a constant angle $\phi$, where $0 < \phi \leq \pi/2$.

At the end of the method, the results can be displayed on a screen or printout.

To put the method into the context of the full simulation, a method of molecular simulation of a system over time may comprise the steps of modelling the system using an atomistic model; carrying out the method of simulating behaviour of a thermodynamic system as set out above and analysing the results obtained from the simulation and relating them to macroscopic level properties.

After the system has been modelled, the results of the modelling can be related to the macroscopic properties allowing assessment and optionally also modification of the system at a microscopic level. The method can then be repeated on the modified system.

Embodiments of another aspect of the invention provide an apparatus which simulates behaviour of a thermodynamic system over time, the thermodynamic system having potential energy that can be split into more quickly varying parts and more slowly varying parts, and having a state described by collective vectors of position and momentum at any given time, the apparatus comprising a momentum refreshment processing part, a conservative dynamics processing part, and an acceptance/rejection processing part, wherein the momentum refreshment processing part comprises functionality for mixing the collective momentum vector with a noise vector; the conservative dynamics processing part comprises functionality for applying a mollified impulse multiple time stepping conservative dynamics method to a current state, in which calculations for forces corresponding to more slowly varying energy parts in the thermodynamic system undergo an averaging procedure and are carried out at a larger time step than calculations for forces corresponding to more quickly varying energy parts; and wherein the acceptance/rejection processing part comprises functionality based on the system energy for accepting a current state or returning a replacement state.

The preferred features of the above method statements are also applicable to this apparatus aspect.

The method is preferably carried out by a computer or computer network, the specification and arrangement of such computing functionality being well known to a person skilled in the art of molecular simulation.

The present invention can be implemented to give many advantages over the prior art methods for simulating multi-scale systems, for example over a range of thermodynamic ensembles such as NPT and NVT ensembles.

In more detail, embodiments of the invention can:
1. enable efficient detailed atomistic simulations of extremely large macromolecular systems which are not possible with existing simulation methods;
2. offer the following advantages over existing MTS implementations:
   Stability: MTS-GHMC is always stable while other MTS methods suffer from resonance or non-resonance induced instabilities.
   Accuracy: MTS-GHMC rigorously samples from the constant temperature ensemble in contrast to existing MTS methods.
   Efficiency: MTS-GHMC is able to reduce the frequency of calculation of expensive slow forces by a factor of ~20 compared with traditional MD methods and by a factor of ~2 over the best performing MTS approaches.
   Applicability: MTS-GHMC is considerably more efficient than standard techniques when applied to a wide range of atomistic models: from very simple ones to extremely large biomolecular systems (e.g. whole viruses). The results may prove to be a valuable contribution in materials science and biosciences and eventually contribute to public health and medicine.
3. be amenable to massively parallel computing.

The state of the art and invention will now be explained with reference to specific examples and drawings, in which.

General Embodiment

Figure 1:
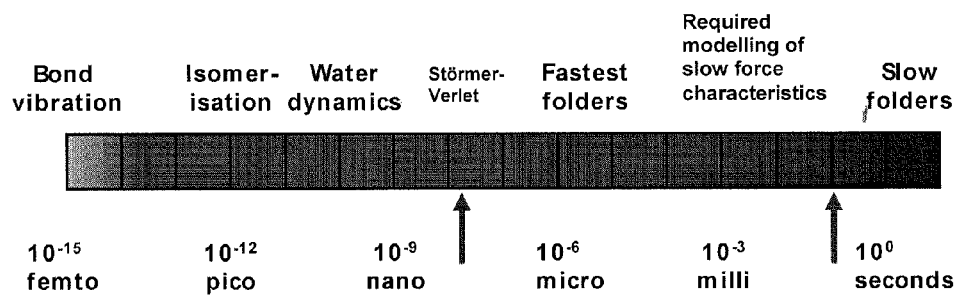
FIG. 1 is a schematic diagram depicting the dynamics of molecules such as protein molecules.
Figure 2:
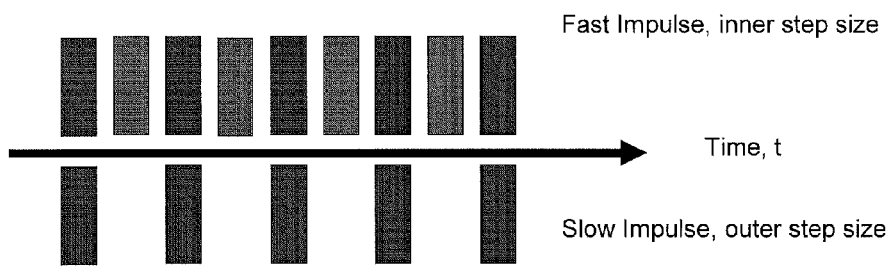
FIG. 2 is a diagrammatic explanation of the MTS general methodology.
Figure 3:
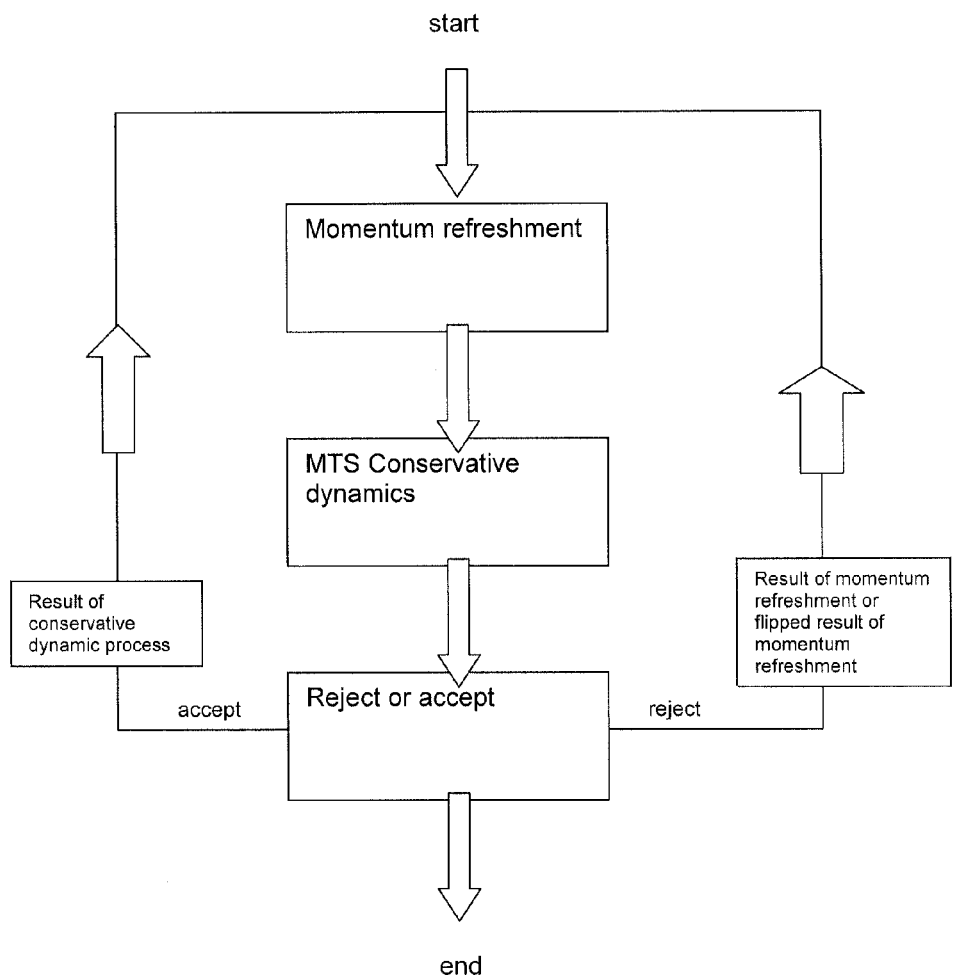
FIG. 3 is a flow chart representing a general embodiment.

FIG. 3 shows an outline embodiment of the invention. There is a momentum refreshment process, followed by an MTS conservative dynamics process and then the results are tested. If they are accepted, the test procedure returns the results as is; if they are rejected the test procedure returns the state after the momentum refreshment process, with or without a momentum flip. The entire method can be repeated.

The following sections are directed to the mathematical derivation and application of the MTS GHMC method.

Problem Statement and Proposed Methodology

Molecular dynamics (MD) requires the solution of Newton's equations of motion for a classical unconstrained simulation $$M\frac{d^2}{dt^2}X = -\nabla U(X), \tag{1}$$

where M is a diagonal mass matrix of atomic masses, X is the collective atomic position vector, U is the potential energy, typically given by $$U = U^{bonded} + U^{nonbonded}, \tag{2}$$

$$U^{bonded} = U^{bond} + U^{angle} + U^{dihedral} + U^{improper}, \tag{3}$$

$$U^{nonbonded} = U^{Lennard-Jones} + U^{electrostatics}, \tag{4}$$

and the gradient vector $-\nabla U(X)$ is the force. Let N denote the number of atoms of the molecular model. Then the computational complexity of bonded interactions is proportional to N while it scales with $N^2$ for non-bonded interactions. Simple cut-off schemes have been devised to reduce the computational cost of non-bonded interactions. But it has also been found that cut-off schemes lead to poor approximations for highly charged systems such as biomolecular systems (Schlick, 2002).

MD simulations are typically performed either under constant number of particles N, volume V and temperature T (NVT ensembles) or under constant number of particles N, pressure $\wp$ and temperature T (N$\wp$T ensembles). Various techniques have been proposed to perform such ensemble simulations (see, e.g., Allen & Tildesley, 1987). In the following, we will focus on NVT ensemble simulations and will use Langevin dynamics to control temperature, but the conclusions apply analogously to N$\wp$T and other ensembles. Details will be given later.

Throughout, we use the following conventions. We assume that collective atomic position vector X and the collective atomic momentum vector $P = M\dot{X}$ are column vectors of length 3N. We also introduce the state vector $\Gamma = (X^T, P^T)^T$, which is a column vector of length 6N, and the collective atomic velocity vector $V = M^{-1}P = \dot{X}$. Here $Y^T$ denotes the transpose of a vector Y, i.e., $Y^T$ is a row vector if Y is a column vector and vice versa.

Expectation values from a NVT ensemble are characterized by the canonical distribution $$\rho_{canon} \propto \exp(-\beta H), \tag{5}$$

where $\beta = 1/k_B T$ is the inverse temperature and H is the total energy, which in turn is defined by $$H(\Gamma) = \frac{1}{2}P^T M^{-1} P + U(X). \tag{6}$$

We introduce the following notation. Given a function $f$ of the state variable $\Gamma$, we denote its expectation value with respect to $\rho_{canon}$ by $$E[f] = \int f(\Gamma) \rho_{canon}(\Gamma) d\Gamma. \tag{7}$$

Under the assumption of ergodicity, the ensemble average (7) can be replaced by a time-average along trajectories from a MD simulation under the NVT ensemble and one obtains $$E[f] = \lim_{t' \to \infty} \frac{1}{t'} \int_0^{t'} f(\Gamma(t)) dt, \tag{8}$$

which forms the base of computing expectation values from MD simulations. Typical quantities of interest include expectation values for energies and velocity autocorrelation functions (Allen & Tildesley, 1987).

The approximate computation of expectation values using (8) requires performing MD simulations over time intervals [0,t'] with t' as large as possible. The length of a MD simulation is, on the other hand, limited by the length of the time-step that can be used. Making use of the multi-scale structure of the molecular force fields, MD simulations have been greatly accelerated by the use of multiple-time-stepping (MTS) methods, such as the Verlet-I/r-RESPA method (Grubmüller et al., 1991; Humphreys et al., 1994), which is based on approximating "slow" forces as widely separated impulses. One derives impulse MTS methods by first rewriting (1) as $$M\frac{d^2}{dt^2}X = F^{fast}(X) + F^{slow}(X), \tag{9}$$

where $F^{fast} = -\nabla U^{fast}$ and $F^{slow} = -\nabla U^{slow}$ subject to $U = U^{fast} + U^{slow}$. The partitioning of the potential U into a "fast" part $U^{fast}$ and a "slow" part $U^{slow}$ is done such that an appropriate outer (larger) time-step $\Delta t$ for the slow part is significantly larger than an inner (smaller) time-step $\delta t$ for the fast part, evaluations of the fast force field $F^{fast}$ are computationally much less expensive than evaluations of $F^{slow}$.

Given an integer p>1 such that the outer time-step $\Delta t$ and the inner time-step $\delta t$ satisfy $\Delta t = p\delta t$, an impulse MTS method can now be stated as $$M\frac{d^2}{dt^2}X(t) = \sum_{m=0}^{L} c_m \Delta t \delta_x(t - m\Delta t) F^{slow}(X(t)) + \sum_{n=0}^{pL} d_n \delta t \delta_x(t - n\delta t) F^{fast}(X(t)), \tag{10}$$

for $t \in [0, t' = L\Delta t]$, $\delta_x$ is the Dirac delta function, and $c_m = d_n = 1$ except when m=n=0 or m=L, n=pL, respectively, in which case $c_m = d_n = \frac{1}{2}$. Analytic solutions to (10) (i.e., numerical approximations to (1)) can be found by integrating (10) twice with respect to time. See Appendix A for more details.

MTS methods, such as (10), can dramatically speed up MD simulations since the expensive force field evaluations $F^{slow}$ need to be performed only at the larger outer time-step $\Delta t$. In this context, note that, for biomolecular applications, the computational complexity of the fast force field evaluations scales linearly in the number of atoms N while it scales quadratically in N for the slow force field evaluations. Furthermore, while the short-ranged fast forces are easy to compute in parallel, long-ranged slow forces require global data communication and hence are more difficult to parallelize efficiently.

However, the impulse MTS method (10) suffers from resonance instabilities. For solvated biomolecular systems, one, for example, has to restrict the time step-ratio $p = \Delta t / \delta t$ to $p \leq 4$ with an inner time-step of $\delta t = 1$ fs (Izaguirre et al., 1999).

Another problem is that common time-stepping methods do not exactly sample from the target temperature T even if the simulations are stable and are subject to a thermostat (Pastor et al., 1988; Bond and Leimkuhler, 2007). This error can be controlled by making the step-size $\Delta t$ sufficiently small and, in particular, much smaller than required by stability considerations alone. However, reducing $\Delta t$ also reduces computational efficiency.

Recent research has partially resolved some of these issues. On the one hand, resonance induced instabilities of impulse MTS methods have been eliminated through the introduction of mollified MTS methods (in which the "slow" parts are effectively averaged) by Izaguirre et al., 1999. Further improvements have been achieved by weak coupling to a stochastic heat bath (Langevin dynamics) (Izaguirre et al., 2001). However, accurate simulations still require a step-size ratio $p = \Delta t / \delta t$ in the range of $p = 6, \ldots, 12$ for solvated biomolecular systems (Izaguirre et al., 1999, 2001).

Here we have recognised that a different technique can be of use for MTS methods and propose to apply and extend the GHMC method such that a thermodynamically consistent weak stochastic stabilization of mollified MTS methods can be achieved. We will demonstrate that the combined MTS-GHMC method results in an improved stability of MTS methods, including mollified and statistically stabilised methods.

In the following section, we summarize the improved MTS methods of Izaguirre et al., 1999, 2001.

Mollified Multiple-Time-Stepping Methods

We first summarize the basic results of Izaguirre et al., 1999 and suggest an improved force field mollification based on the concept of soft constraints, as introduced by Zhou et al., 2000.

Constant Energy Mollified MTS Method

Let $r_{ij} \geq 0$ denote the distance between atom i and atom j. The switching function S serves to split non-bonded interactions into slow and fast parts. It is defined by $$S(r_{ij}) = \begin{cases} 0 & \text{if } r_{ij} > r_{cutoff}, \\ 1 & \text{if } r_{ij} < r_{on}, \\ \frac{(r_{cutoff}^2 - r_{ij}^2)(r_{cutoff}^2 + 2r_{ij}^2 - 3r_{on}^2)}{(r_{cutoff}^2 - r_{on}^2)} & \text{if } r_{on} \leq r_{ij} \leq r_{cutoff}, \end{cases} \quad (11)$$

for given cutoff radius $r_{cutoff}$ and transition interval defined by $[r_{on}, r_{cutoff}]$. Given a potential energy U with entries defined by (2)-(4) we now define the "fast" potential by $$U^{fast} = U^{bonded} + U^{nonbonded}S \quad (12)$$

and the slow contribution by $$U^{slow} = U^{nonbonded} - U^{nonbonded}S. \quad (13)$$

Mollified MTS methods are now defined by an operator $$\overline{X} = A(X) \quad (14)$$

which assigns a filtered, averaged position $\overline{X}$ to an instantaneous collective atomic position vector X. The averaging operator is then applied to the slow potential to yield a mollified slow potential $$U_{molly}^{slow}(X) = U^{slow}(A(X)). \quad (15)$$

The mollified impulse MTS method of Izaguirre et al., 1999 is now given by $$M \frac{d^2}{dt^2} X(t) = \sum_{m=0}^{L} c_m \Delta t \delta_x(t - m\Delta t) F_{molly}^{slow}(X(t)) + \sum_{n=0}^{pL} d_n \delta t \delta_x(t - n\delta t) F^{fast}(X(t)), \quad (16)$$

for $t \in [0, t' = L\Delta t]$ with the slow forces defined by $$F_{molly}^{slow}(X) = -\nabla U_{molly}^{slow}(X) = A_X(X)^T F^{slow}(A(X)), \quad (17)$$

where $A_X(X)$ denotes the Jacobian matrix of partial derivatives. The coefficient $c_m$ and $d_n$ take values as defined for (10).

One notes that (16) can be viewed as a standard impulse MTS method (10) applied to a "mollified" molecular system defined by the energy functional $$H_{molly}(\Gamma) = \frac{1}{2} P^T M^{-1} P + U^{fast}(X) + U_{molly}^{slow}(X). \quad (18)$$

The assumption is, of course, that the difference between (6) and (18) is small. Nevertheless the difference between H and $H_{molly}$ has to be kept in mind and we will come back to this issue when putting (16) into the context of generalized hybrid Monte Carlo (GHMC) methods (Kennedy and Pendleton, 2001; Horowitz, 1991; Akhmatskaya et al., 2009).

Two particular instances of averaging operators A have been presented in Izaguirre at al., 1999. While both operators can be used in the context of the newly proposed MTS-GHMC method, we focus here on the Equilibrium method, which has been shown to lead to the most stable variant of (16) (Izaguirre at al., 1999, 2001). Let us write the bond stretching and bond bending potentials as $$U^{bond}(X) + U^{angle}(X) = \frac{1}{2} g(X)^T K g(X), \quad (19)$$

where K is diagonal matrix of force constants and g(X) is a vector of independent bond constraints (stretches and bends). Let us denote the Jacobian matrix of partial derivatives $g_x(X)$ by G(X). The averaging operator $\overline{X} = A(X)$ for the method Equilibrium is defined by the implicit system of equations $$\overline{X} = X - M^{-1} G(X)^T \mu \quad (20)$$

$$0 = g(\overline{X}) \quad (21)$$

in the vector of Lagrange multipliers $\mu$. Details of the implementation of Equilibrium can be found in Izaguirre at al., 1999, which is incorporated herein by reference.

It has been demonstrated by Zhou et al., 2000 that the averaged positions X are better characterized by soft constraints, i.e., (21) should be replaced by $$0 = G(X)M^{-1}\nabla U^{fast}(X). \quad (22)$$

In other words, $\overline{X}$ is now defined as the minimizing state for the potential energy $U^{fast}$ along $M^{-1}G(X)^T$.

Langevin Stabilization

The stochastically stabilized and mollified MTS methods of Izaguirre et al., 2001 are based on the regular Langevin equations $$dP = -\nabla U_{molly}(X)dt - \gamma P dt + \sqrt{2\gamma k_B T} M^{1/2} dW(t), \, dX = M^{-1} P dt, \quad (23)$$

applied to the mollified potential energy $$U_{molly} = U^{fast} + U_{molly}^{slow}. \quad (24)$$

Here $\gamma$ is the collision frequency, W(t) is a vector of independent standard Wiener processes, $k_B$ is the Boltzmann constant, and T is the target temperature.

Of course (23) can also be applied for MTS methods without mollification.

The collision frequency $\gamma$ should be chosen sufficiently small to not alter dynamic properties of the molecular system. It has been demonstrated in Izaguirre et al., 2001 that $\gamma=0.2$ ps$^{-1}$ is suitable for simulations of solvated biomolecular systems. Further implementation details can be found in Izaguirre et al., 2001. For our numerical experiments we use a particular implementation described in Section 4.2, which is closely related to the newly proposed MTS-GHMC method.

The MTS-GHMC method is described in the next section.

Multiple-Time-Stepping Generalized Hybrid Monte Carlo Method

The proposed simulation method takes a hybrid Monte Carlo (GHMC) method (Kennedy and Pendleton, 2001; Horowitz, 1991) as a starting point. GHMC is a rigorous sampling tool for molecular systems. As such, GHMC can be used, for example, to compute free energies and to find molecular conformations with applications to drug design.

It has also been demonstrated (Akhmatskaya et al., 2009) that GHMC can be implemented without a momentum flip upon rejection of the molecular dynamics proposal step. While the standard GHMC method with momentum flip is to be preferred for sampling purposes, momentum flips interfere strongly with the dynamics of the underlying Langevin equations, as demonstrated in Akhmatskaya et al., 2009, and dynamic properties need to be computed by other means. Provided that the acceptance rate in a GHMC implementation without momentum flip does not drop below a certain threshold, GHMC without flip improves the accuracy as well as the stability of a time-stepping method without Metropolis correction and can reproduce dynamical properties faithfully.

We now demonstrate how to combine GHMC with a mollified MTS method (but note that a combination with an MTS method without mollified terms is also possible). To do so, we assume that a splitting of the potential energy function U into a fast contribution (12) and a slow contribution (13) is given. We also assume that an averaging operator (14) has been defined, which implies a mollified slow potential (15) and a mollified total energy (18).

MTS-GHMC: Algorithmic Summary of One Embodiment

The generalized hybrid Monte Carlo (GHMC) algorithm of Horowitz, 1991 and Kennedy and Pendleton, 2001 for sampling from the canonical ensemble (5) is defined as the concatenation of two MCMC (Markov chain Monte Carlo) steps: a molecular dynamics Monte Carlo (MDMC) and a partial momentum refreshment Monte Carlo (PMMC) step. Two key novel steps of this proposed MTS-GHMC method are the optional elimination of the momentum flip (Akhmatskaya et al., 2009) and the implementation of an MTS method in the MDMC step, provided here with mollified terms. We now summarize the proposed MTS-GHMC method.

The accepted states of the MTS-GHMC method are denoted by $\Omega_i = (\Gamma_i^T, t_i)^T$, $i=0, \ldots, I$, where $\Gamma_i = (X_i^T, P_i^T)^T$, $X_i$ is a collective vector of atomic positions, $P_i$ is a collective vector of atomic momenta, and $t_i$ is time.

Partial Momentum Refreshment Monte Carlo (PMMC)

Given an accepted (or starting) state $\Omega_i = (\Gamma_i^T, t_i)^T$, $\Gamma_i = (X_i^T, P_i^T)^T$, its collective atomic momentum vector $P_i$ is now mixed with an independent and identically distributed normal (Gaussian) noise vector $\Xi_i$ of dimension 3N and the partial momentum refreshment step is given by $$\overline{P}_i = \cos(\phi) P_i + \sin(\phi) \Xi_i \quad (25)$$

where $0 < \phi \leq \pi/2$ is a given angle and $\Xi_i \sim \mathcal{N}[0, \beta M^{-1}]$. Here $\mathcal{N}[0, \beta^{-1}]$ denotes the (3N)-dimensional normal distribution with zero mean and covariance matrix $\beta M^{-1}$, M is the diagonal mass matrix of the molecular system, $\beta = 1/k_B T$ is the inverse temperature. Denote the new state vector by $\overline{\Omega}_i^+ = (\overline{\Gamma}_i^T, t_i)$, $\overline{\Gamma}_i = (X_i^T, \overline{P}_i^T)^T$ and introduce $\overline{\Omega}_i^- = (\overline{\Gamma}_i^{-T}, t_i)^T$, $\overline{\Gamma}_i^- = (X_i^T, -\overline{P}_i^T)^T$. The skilled person will appreciate that the dynamic is only weakly affected and that no acceptance/rejection step is required.

Molecular Dynamics Monte Carlo (MDMC) Proposed Step

This step consists of the following two sub-steps.

Molecular dynamics (MD). We apply the mollified impulse MTS method (16) to the current state $\overline{\Omega}_i$. As shown in Appendix A, (16) gives rise to a time-reversible and volume conserving mapping $\Psi_\tau$, $\tau = L\Delta t$, in $\Gamma = (X^T, \overline{P}^T)^T$ and a proposal state is defined by $$\hat{\Omega}_i = (\hat{\Gamma}_i^T, t_i + \tau)^T, \, \hat{\Gamma}_i = \Psi_\tau(\overline{\Gamma}_i), \quad (26)$$

where L>0 is a given integer.

Monte Carlo (MC). The next accepted state $\Omega_{i+1}$ is found through a Metropolis accept/reject criterion $$\Omega_{i+1} = \begin{cases} \hat{\Omega}_i & \text{with probability } \min(1, \exp(-\beta \Delta H_{molly})) \\ \overline{\Omega}_i^{\pm} & \text{otherwise,} \end{cases} \quad (27)$$

with $$\Delta H_{molly} := H_{molly}(\hat{\Gamma}_i) - H_{molly}(\overline{\Gamma}_i), \quad (28)$$

the energy $H_{molly}$ is defined by (18). Depending on the implementation—either without flip or with flip—$\overline{\Omega}_i^+$ or $\overline{\Omega}_i^-$ are used in (27) respectively.

Remarks

We wish to point out that the collective vector of atomic positions $X_i$ as well as time $t_i$ remain unchanged from $\Omega_i$ to $\Omega_{i+1}$ in case of rejection of the MDMC proposal step.

The free parameters of the MTS-GHMC scheme include the angle $\phi$ in (25), the outer step-size $\Delta t$ and the number of outer time-steps L. We will always assume that $$\phi = \sqrt{2\gamma\tau} \ll 1. \quad (29)$$

Here $\gamma > 0$ is the collision frequency of an underlying Langevin model (23) and $\tau = \Delta t L$. Throughout this section we will use L=1.

We note that (25) and (26) without the single Metropolis accept/reject step after the MD sub-step (i.e., with all MD proposal steps being accepted) yield a standard multiple timestepping method for the underlying Langevin equations (23). Other related methods have been discussed in Izaguirre et al., 2001. The Metropolis test (27) turns (25)-(26) into a thermodynamically consistent implementation of stochastically stabilized and mollified MTS methods. See also Akhmatskaya et al., 2009 for a more detailed discussion on the relation between Langevin dynamics (23) and GHMC without momentum flip.

Data Analysis

Let $\{\Omega_i\}_{i=1}^I$ denote a sequence of accepted states from a MTS-GHMC simulation with $\Omega_i = (\Gamma_i^T, t_i)^T$ and $\Gamma_i = (X_i^T, P_i^T)^T$. Expectation values of a function $f(\Gamma)$ with respect to the canonical density (5) are computed according to the formula $$\langle f \rangle = \frac{\sum_{i=1}^{I} w_i f(\Gamma_i)}{\sum_{i=1}^{I} w_i} \tag{30}$$

with weight factors $$\omega_i = \exp(-\beta(H(\Gamma_i) - H_{molly}(\Gamma_i))). \tag{31}$$

Provided the MTS-GHMC method generates an ergodic Markov chain for the given molecular system, we have $$\lim_{I \to \infty} \langle f \rangle = E[f] \tag{32}$$

independent of the specific parameter values of the implemented MTS-GHMC method (Liu, 2001).

In our numerical experiments we will compute expectation value for kinetic and total energy as well as velocity autocorrelation functions (ACF).

Expectation values of the latter are defined as follows. Given a fixed time $t>0$, solutions of (1) introduce a map from initial states $\Gamma(0)$ to the evolved states $\Gamma(t)$ at time t. This map is called the time—t—flow map and we denote it by $\Phi_t$, i.e.

$$\Gamma(t) = \Phi_t(\Gamma(0)). \tag{33}$$

Given the flow map, we can, for example, consider the expectation value $$E[C_\tau] = \frac{1}{3N} \int V^T V(\tau) \rho_{canon}(\Gamma) d\Gamma \tag{34}$$

for $\tau \geq 0$ and with the collective atomic velocity vectors $V = M^{-1}P$ and $V(\tau) = M^{-1}P(\tau)$ defined through $(X^T, P^T)^T = \Gamma$ and $(X(\tau)^T, P(\tau)^T)^T = \Gamma(\tau) = \Phi_{t=\tau}(\Gamma)$ respectively. We recall that N denotes the number of atoms. In practice the velocity ACF $E[C_\tau]$ is computed along trajectories of (23) using $$E[C_\tau] = \frac{1}{3N} \lim_{t' \to \infty} \frac{1}{t'} \int_0^{t'} V(t)^T V(t+\tau) dt \tag{35}$$

(Allen and Tildesley, 1987).

In the context of MTS-GHMC, approximations to the velocity ACF (35) are computed using the following approach. Assume that $\tau$ in (35) is a multiple of $L\Delta t$. Then, given indices $i=1, \ldots, I'$, we denote by $j(i)$ the smallest integer $j>i$ such that $t_j - t_i = \tau$. Here $I' < I$ is chosen such that $j(i)$ exists for all $i=1, \ldots, I'$. The approximate velocity ACF is now defined by $$\langle C_\tau \rangle = \frac{1}{3N} \frac{\sum_{i=1}^{I'} w_i V_i^T V_{j(i)}}{\sum_{i=1}^{I'} w_i}. \tag{36}$$

Note that we do not have $$\lim_{I' \to \infty} \langle C_\tau \rangle = E[C_\tau] \tag{37}$$

since the MTS-GHMC method provides only approximations to the exact flow map (33) unless we also let $\Delta t \to 0$. The effect of finite step-sizes needs to be assessed by numerical experiments.

Model System and Numerical Results

Description of Model System in One Embodiment

We consider a one-dimensional chain of diatomic molecules interacting through Lennard-Jones potentials. One-dimensional test problems such as the one considered here have been widely used to test MTS algorithms (see, for example, Hairer et al., 2002).

We now describe the model system in more detail. All quantities are treated as dimensionless. Each particle/atom has mass m=0.5, position $\chi_i \in [0,l]$ and velocity $v_i \in R$. We assume periodic boundary conditions over a domain of length l=20 and set the number of particles to N=20 (i.e., we consider 10 diatomic molecules). The potential energy of the system is given by $$U(X) = \tag{38}$$

$$\frac{K}{2} \sum_{i=1}^{N/2} (|x_{2i-1} - x_{2i}| - 1)^2 + 2 \sum_{i=1}^{N} \sum_{j \in n(i)} \left[ \left( \frac{\sigma}{|x_i - x_j|} \right)^{12} - \left( \frac{\sigma}{|x_i - x_j|} \right)^6 \right],$$

where n(i) contains the indices of the (N−3) nearest non-bonded neighbors of particle i, $\sigma^6 = \frac{1}{2}$, and K=1.5421e+05.

Note that the frequency of the fast diatomic bond vibrations is given by $$\omega = \sqrt{2K/m} \approx 785.3982. \tag{39}$$

This frequency has been chosen such that the linear stability limit of the standard Störmer-Verlet method is $\Delta t \leq 2/\omega \approx 0.0025$ and the first numerical resonance of the standard MTS method occurs at $\Delta t \approx \pi/\omega = 0.004$ (Izaguirre et al., 1999). Hence our model system qualitatively mimics the stability limits found for MTS methods applied to solvated biomolecular systems (Izaguirre et al., 1999) with one dimensionless time unit corresponding to one picosecond. We will use this (formal) association of dimensionless "model" time with "real" time throughout this section.

Furthermore, the stability limit of the Störmer-Verlet method applied to the Lennard-Jones interactions alone was found numerically to be around $\Delta t=0.015$ ps. We note that this stability limit is of the same order of magnitude as the achievable outer step-sizes reported by Izaguirre et al., 2001 for Langevin stabilized and mollified MTS methods. It should, however, be kept in mind that the large time-step behavior of biomolecular simulations is much more complex than what our model system can represent.

We perform constant NVT simulations at $\beta=1/k_B T=1$ using the proposed embodiment of the MTS-GHMC method implemented without momentum flip and compare the results to Langevin stabilized MTS simulations (MTS-LD). Following Izaguirre et al., 2001, the collision frequency is $\gamma=0.2$ ps$^{-1}$ in all cases. The slow and fast potential energy contributions are defined by the stiff bonded interactions and the Lennard-Jones interactions, respectively. We monitor the mean kinetic and total energies as well as the velocity ACF for the center of mass motion of the diatomic molecules. In case of MTS-GHMC we also collect the acceptance rates (AR) in the Metropolis accept/reject criterion (27).

TABLE 1

| Method | outer step-size | numerical ⟨H⟩ | numerical temperature | AR |
|---|---|---|---|---|
| MTS-GHMC | 10 fs | 29.1690 | 1.0045 | 96% |
| MTS-GHMC | 12 fs | 29.2516 | 1.0001 | 95% |
| MTS-GHMC | 14 fs | 29.1168 | 0.9998 | 90% |
| MTS-GHMC | 16 fs | 29.6510 | 1.0097 | 85% |
| MTS-GHMC | 18 fs | 29.7806 | 1.0203 | 76% |
| MTS-GHMC | 20 fs | 30.1491 | 1.0270 | 66% |
| MTS-GHMC | 22 fs | 30.9180 | 1.0533 | 55% |
| MTS-LD | 10 fs | 29.3044 | 1.0041 | NA |

In Table 1 we compare averages of total energy and computed temperatures (from the mean kinetic energy) for MTS-GHMC and MTS-LD simulations as a function of the outer time-step. The inner time-step is $\delta t=0.25$ fs for all simulations. We also report Metropolis acceptance rates (AR) in case of MTS-GHMC. The target temperature is T=1 and the reference simulation LD gave an averaged total energy of ⟨H⟩=29.4121. All reported results are within 5% of these reference value except for MTS-GHMC with an outer time-step of $\Delta t=22$ fs. All outer time-steps equal or less than 22 fs lead to an acceptance rate above 50%.

Figure 4:
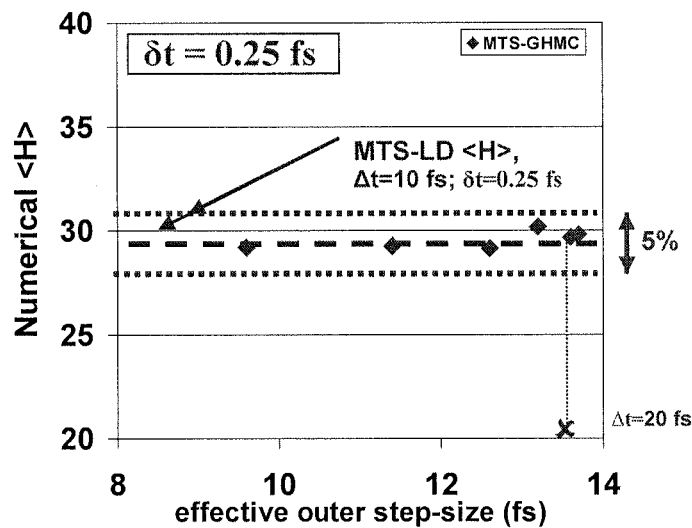
FIG. 4 is a plot of mean energy against effective outer step size for MTS LD and MTS GHMC.

FIG. 4 shows the effective outer step size (taking the acceptance rate into account for the MTS-GHMC method) plotted against mean energy as Numerical (N) for MTS LD and MTS GHMC. The largest achievable outer step-size for MTS-LD is $\Delta t=10$ fs whereas for MTS-GHMC it can be increased to 20 fs. Due to non-100% acceptance rate this corresponds to an effective outer step-size of 12.7 fs. MTS-GHMC reproduces the mean energy and temperatures within 5% of the reference values for outer step-sizes of up to 20 fs.

Figure 5:
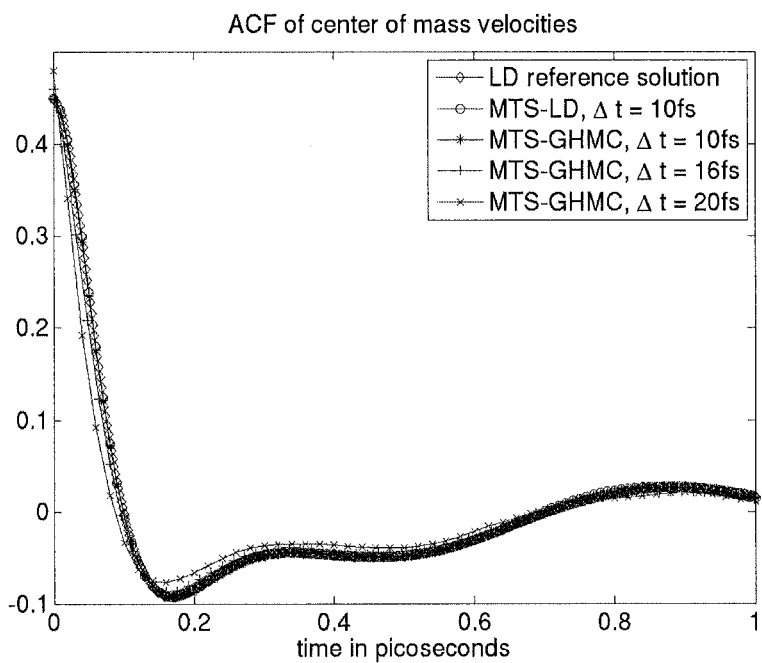
FIG. 5 is a graph showing the autocorrelation functions of diatomic center of mass velocities.

FIG. 5 shows the Autocorrelation functions (ACFs) of diatomic center of mass velocities for MTS-GHMC as a function of the outer time-step $\Delta t$. Given the fact that we cover a relative large range of time-steps beyond the stability limit of MTS-LD, the computed ACFs agree remarkably well. The corresponding ACF for MTS-LD with $\Delta t=10$ fs and the ACF from the small time-step reference simulation LD are also provided for comparison.

Numerical Results

We first implemented the standard Störmer-Verlet method (Allen and Tildesley, 1987; Hairer et al., 2002) and verified numerically that the method is stable for $\Delta t=2$ fs while being unstable for $\Delta t=3$ fs. A numerical reference solution was then computed using a Langevin dynamics implementation of Störmer-Verlet with $\Delta t=0.25$ fs, collision frequency $\gamma=0.2$ ps$^{-1}$, and inverse temperature $\beta=1$. We will use the abbreviation LD to refer to this reference simulation.

Next we implemented the standard MTS method of Grubmüller et al., 1991 and Humphreys et al., 1994 with an inner time-step of $\delta t=0.25$ fs. Simulations were run over a time-interval of ten microseconds. A significant (but bounded) drift in energy was observed for an outer time-step of $\Delta t=4$ fs. Even worse, an unbounded increase in energy was observed at the second numerical resonance, i.e., for $\Delta t=8$ fs. This resonance instability could not be overcome by Langevin stabilization. We also implemented MTS-GHMC with a non-mollified force field and observed an acceptance rate as low as 2% in the Metropolis test (27) for an outer time-step of $\Delta t=8$ fs. This confirms the findings of Izaguirre et al. (1999, 2001) that the achievable outer step-sizes of standard MTS implementations are limited by numerical resonances (and not by accuracy considerations).

We finally implemented the mollified MTS method Equilibrium, as described in Section 3.1, with the switching function S being set identical equal to zero, i.e., all Lennard-Jones interactions are treated as slow. Again an inner time-step of $\delta t=0.25$ fs has been used, the number L of MTS-MD steps within a single MTS-GHMC step was set equal to L=1, the inverse temperature was $\beta=1$, and the collision frequency was $\gamma=0.2$ ps$^{-1}$, i.e., $\phi=\sqrt{0.4\Delta t}$ in (25). For numerical comparison, we also implemented a Langevin stabilized and mollified MTS method using identical parameter settings (see Remarks section, above). We will use the abbreviations MTS-GHMC and MTS-LD to refer to the corresponding numerical results. The number of outer time-steps/samples for MTS-LD/MTS-GHMC was set equal to the integer closest to 10 microseconds divided by the outer step-size $\Delta t$.

We found that the largest achievable outer time-step for MTS-LD is $\Delta t=10$ fs. This might be surprising at the first glance since constant energy simulations with Lennard-Jones interactions alone allowed for a larger time-step of $\Delta t=15$ fs. However, one has to keep in mind that thermostatted MD simulations lead to relatively large fluctuations in instantaneous values of total energy which allow for rare high energy Lennard-Jones collisions. These collisions can destabilize MTS-LD. Hence the achievable outer step-size of MTS-LD is determined by stability and not by accuracy of the method. MTS-GHMC, on the contrary, was found to be stable for all implemented outer step-sizes. Given that errors in mean total energy and in the computational temperature should not exceed 5% of the reference values and that the acceptance rate should stay above 50%, we found that the largest acceptable outer time-step of MTS-GHMC is $\Delta t=20$ fs. See Table 1 for the computed values of mean total energy, temperature and acceptance rates of MD proposal steps. Note that the computed mean energy and temperature converge to the exact values as the number of MTS-GHMC steps is increased (assuming ergodicity of the induced Markov chain (Liu, 2001)). To get a better impression on the accuracy of MTS-GHMC as a function of the outer time-step we also computed the center of mass velocity ACFs. See FIG. 5. We find excellent agreement between MTS-LD and MTS-GHMC for $\Delta t=10$ fs. For values larger than $\Delta t=16$ fs, the computed ACFs for MTS-GHMC become increasingly inaccurate. In summary, we may conclude that the achievable outer time-step of MTS-GHMC is determined by accuracy considerations alone.

CONCLUSIONS

Here we summarize the main findings from our numerical experiments for this particular embodiment. We have found that both MTS-LD and MTS-GHMC successfully avoid resonance induced instabilities of standard MTS implementations. The achievable outer-step size of MTS-LD is limited by rare but strong Lennard-Jones collisions which induce numerical blow-up. For our model system the largest achievable outer step-size for MTS-LD is $\Delta t=10$ fs. Stable MTS-LD simulations reproduced the mean energy and the target temperature remarkably well. On the other hand, MTS-GHMC always resulted in bounded (i.e., stable) simulations even for very large outer step-sizes. However, the acceptance rate drops below 70% for step-sizes larger than 18 fs and below 50% for step-sizes larger than 22 fs. We also computed the ACFs for the center of mass velocities of the diatomic molecules and found good agreement with the reference solution. The agreement deteriorates somewhat for outer step-sizes larger than 16 fs.

In conclusion, the key advantages of this embodiment of MTS-GHMC over MTS-LD are as follows (ordered by importance):

Stability: MTS-GHMC is always stable while MTS-LD encounters blow-ups due to rare events involving very strong Lennard-Jones interactions.

Accuracy: Assuming ergodicity, MTS-GHMC converges rigorously to the NVT ensemble as the number of samples increases. Accurate computations of time-dependent quantities such as ACF place an upper bound on the achievable outer time-step. Those upper bounds are larger than the stability bound on MTS-LD.

Efficiency: The outer time-step of MTS-GHMC can be increased by a factor of about 1.6-2.0 over MTS-LD. However, an increase of step-sizes leads to an increase in Metropolis rejection rates. Hence the effective (sampling) efficiency gain is lower than the gain determined by step-size ratios alone. A natural measure for efficiency is given by the ratio of an effective step-size $\Delta t_{eff} = \Delta t \times AR/100$ for MTS-GHMC to the largest achievable outer step-size for MTS-LD, which is 10 fs for our model system. Here AR is a Metropolis acceptance rate. Using the data from Table 1, we find $\Delta t_{eff} \approx 14$ fs and, hence, an efficiency gain is about of 1.4. There are limitations of our model system compared to biomolecular simulations that need to be pointed out clearly. In particular, numerical evidence suggests that the achievable outer step-size of mollified MTS methods is limited by resonance instabilities at about 8 fs for explicit water simulations (Izaguirre et al., 1999). Additional resonance instabilities are found for even larger outer step-sizes (Izaguirre et al., 2001). These instabilities can be masked by using Langevin dynamics with increasingly large values of the collision frequencies $\gamma$ (Izaguirre et al., 2001). On the other hand, the achievable outer step-size for our model system is limited by the stability of Störmer-Verlet with respect to Lennard-Jones interactions rather than resonance instabilities. This instability cannot be overcome by Langevin dynamics even with increasingly large values of $\gamma$. This (non-resonance) stability barrier also limits the possible efficiency gains for MTS-GHMC. Finally, note that short-range contributions of the Lennard-Jones interactions have been treated as part of the fast forces in Izaguirre et al. (1999, 2001).

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

APPENDIX A

Impulse Time-Stepping Methods

In this appendix, we outline how (16) can be solved exactly to give rise to a numerical approximation for the differential equation $$M \frac{d^2}{dt^2} X = -\nabla U^{fast}(X) - \nabla U^{slow}_{molly}(X). \quad (40)$$

We note that equation (40) is conservative with energy (18).

We recall that the ratio between the inner time-step $\Delta t$ and the outer time-step $\Delta t$ is denoted by $p=\Delta t/\delta t$ and L is the number of outer time-steps. We introduce the notation $P(t'+\epsilon)$ and $P(t'-\epsilon)$ to denote the left and right hand side, respectively, limits of a time-dependent collective atomic momentum vector $P(t)$ with a discontinuity at $t=t'$. We also introduce $t_n=n\delta t$, $n=0, \ldots, pL$.

Integration of (16) once with respect to time reveals that $P(t)$=const, whenever $t \neq t_n$, which implies $$X(t_{n+1})=X(t_n)+\delta t M^{-1} P(t_n+\epsilon), P(t_{n+1}-\epsilon)=P(t_n+\epsilon). \quad (41)$$

For all $t=t_n$, $n=0, \ldots, pL$, an "impulse/kick" is applied to the velocities while the positions remain constant, i.e., $X(t_n+\epsilon)=X(t_n-\epsilon)=X(t_n)$ since $X(t)$ is continuous. The magnitude of the impulse/kick depends on whether there is an integer m, $m=0, \ldots, L$, such that n=mp (outer time-step) or not (inner time-step). In case of an outer time-step we have $$P(t_n+\epsilon)=P(t_n-\epsilon)+c_m \Delta t F^{slow}_{molly}(X(t_n))+d_n \delta t F^{fast}(X(t_n)), (n=pm) \quad (42)$$

while an inner time-step leads to $$P(t_n+\epsilon)=P(t_n-\epsilon)+d_n \delta t F^{fast}(X(t_n)). \quad (43)$$

The constant coefficients $c_n$ and $d_m$ take values as defined for (10).

Given an initial molecular state $\Gamma(0)$, we formally set $P(-\epsilon)=P(0)$ to initiate the algorithm. Similarly, at final time $\tau=\Delta t L$, we formally set $P(\tau)=P(\tau+\epsilon)$ to define the molecular state vector $\Gamma(\tau)$ at $t=\tau$. Hence we have constructed a mapping $\Psi_\tau:\Gamma(0) \to \Gamma(\tau)$ which maps an initial molecular state $\Gamma(0)$ into the desired numerical approximation $\Gamma(\tau)$ at time $\tau=L\Delta t=pL\delta t$. The mapping $\Psi_\tau$ is time-reversible, symplectic and volume conserving (Izaguirre et al., 1999).

The invention claimed is:

1. A computer-implemented method of simulating behaviour of a thermodynamic system over time, the thermodynamic system having potential energy that can be split into more quickly varying parts and more slowly varying parts and having a state described by collective vectors of position and momentum at any given time, the method comprising a momentum refreshment process, a conservative dynamics process, and an acceptance/rejection process, wherein the momentum refreshment process comprises mixing the collective momentum vector with a noise vector;

the conservative dynamics process comprises applying a mollified impulse multiple time stepping conservative dynamics method to a current state, in which process calculations for forces corresponding to more slowly varying energy parts in the thermodynamic system undergo an averaging procedure and are carried out at a larger time step than calculations for forces corresponding to more quickly varying energy parts; and wherein the acceptance/rejection process is based on the system energy and comprises accepting a current state or returning a replacement state.

2. A method according to claim 1, wherein either the momentum refreshment or the conservative dynamics process is the first process of the method, and the resulting state of any process in the method provides the current state for the next process in the method.

3. A method according to claim 1, wherein the method includes a single acceptance/rejection process, wherein the momentum refreshment is the first process of the method, and the acceptance/rejection process follows the conservative dynamics process and wherein if the current state is rejected in the acceptance/rejection process, the state vector resulting from the momentum refreshment process is either returned as the replacement state or undergoes a momentum flip to provide the replacement state.

4. A method according to claim 1, wherein the momentum refreshment process and/or the conservative dynamics process constitutes a multiple iteration process, in which the entire process is repeated a selected number of times consecutively, to provide a final resulting state, which may be used as a current state for the next process.

5. A method according to claim 1, wherein the states in the method are denoted by $\Omega_i=(\Gamma_i^T,t_i)^T$, $i=0,\ldots,I$, where $I$ is a given integer, $\Gamma_i=(X_i^T,P_i^T)^T$, $X_i$ is a collective vector of atomic positions, $P_i$ is a collective vector of atomic momenta, and $t_i$ is time and the momentum refreshment process comprises: given a current state $\Omega_i=(\Gamma_i^T,t_i)^T$, $\Gamma_i=(X_i^T,P_i^T)^T$, mixing its collective atomic momentum vector $P_i$ with an independent and identically distributed normal noise vector $\Xi_i$ of dimension 3N, so that $$\overline{P}_i = \cos(\phi)P_i + \sin(\phi)\Xi_i$$

where i is a given integer, N is the number of particles in the system, $0<\phi\leq\pi/2$ is a given angle and $\Xi_i \sim \mathcal{N}[0,\beta M^{-1}]$, $\mathcal{N}[0,\beta M^{-1}]$ denotes the (3N)-dimensional normal distribution with zero mean and covariance matrix $\beta M^{-1}$, M is the diagonal mass matrix of the molecular system, and $\beta=1/k_B T$ is the inverse temperature, the resulting state vector being denoted by $\overline{\Omega}_i=(\overline{\Gamma}_i^T,t_i)^T$, $\overline{\Gamma}_i=(X_i^T,\overline{P}_i^T)^T$.

6. A method according to claim 1, wherein the states in the method are denoted by $\overline{\Omega}_i=(\overline{\Gamma}_i^T,t_i^T$, $i=0,\ldots,I$, where $l$ is a given integer, $\overline{\Gamma}_i=(X_i^T,\overline{P}_i^T)^T$, $X_i$ is a collective vector of atomic positions, $\overline{P}_i$ is a collective vector of atomic momenta, and $t_i$ is time and wherein the conservative dynamics process comprises: applying the mollified multiple time stepping method to the current state $\overline{\Omega}_i$ using a time-reversible and volume conserving mapping $\Psi_\tau$, $\tau=L\Delta t$, in $\hat{\Gamma}=(\hat{X}^T,\hat{P}^T)^T$ and a resulting state defined by $$\hat{\Omega}_i=(\hat{\Gamma}_i^T,t_i+\tau)^T, \hat{\Gamma}_i=\Psi_\tau(\overline{\Gamma}_i),$$

where L>0 is a given integer and $\Delta t$ is the larger time step.

7. A method according to claim 1, wherein the mollified multiple time stepping method applies an averaging operator A to a collective position vector X and derives slowly varying mollified potential energy $U_{molly}^{slow}$ related to the slowly varying potential energy and yields $F_{molly}^{slow}$ wherein preferably:

$$M\frac{d^2}{dt^2}X(t) = \sum_{m=0}^{L} c_m \Delta t \delta_x(t-m\Delta t)F_{molly}^{slow}(X(t)) + \sum_{n=0}^{pL} d_n \delta t \delta_x(t-n\delta t)F^{fast}(X(t)),$$

for $t\in[0,t'=L\Delta t]$ with the slow forces defined by $$F_{molly}^{slow}(X) = -\nabla U_{molly}^{slow}(X) = A_x(X)^T F^{slow}(A(X)),$$

where M is a diagonal mass matrix of atomic masses, $A_x(X)$ denotes the Jacobian matrix of partial derivatives, the larger time-step for more slowly varying forces $F^{slow}$ is $\Delta t$, the smaller time-step for more quickly varying forces is $F^{fast}$ is $\delta t$, $\delta_x$ is the Dirac delta function, $c_m=d_n=1$ except when m=n=0 or m=L, n=pL, respectively, in which case $c_m=d_n=\frac{1}{2}$, and integer p>1.

8. A method according to claim 2, wherein the acceptance/rejection process comprises testing a current state to find the next accepted state $\Omega_{i+1}$ using a Metropolis accept/reject criterion $$\Omega_{i+1} = \begin{cases} \hat{\Omega}_i & \text{with probability } \min(1, \exp(-\beta\Delta H_{molly})) \\ \overline{\Omega}_i^\pm & \text{otherwise,} \end{cases}$$

with $$\Delta H_{molly} := H_{molly}(\hat{\Gamma}_i) - H_{molly}(\overline{\Gamma}_i),$$

in which $\overline{\Omega}_i^\pm$ denotes either $\overline{\Omega}_i^-$ or $\overline{\Omega}_i^+$ $\overline{\Omega}_i^-$ indicating applying a momentum flip to the state $\overline{\Omega}_i$ and $\overline{\Omega}_i^+=\overline{\Omega}_i$ and indicates that no momentum flip has been applied.

9. A method according to claim 1, wherein calculated properties are re-weighted at the end of the entire method, to allow for the use of mollified terms.

10. A method according to claim 1, further comprising a step of initially accepting input of simulation conditions, wherein the simulation conditions include at least one of volume, mass, temperature, pressure, number of particles, and total energy; and/or further comprising a step of initially accepting input of simulation parameters, wherein the simulation parameters include at least one of a number of repetitions of the momentum refreshment process and a number of repetitions of the conservative dynamics process, the larger and smaller time steps in conservative dynamics, the number of iterations of the entire method, the current state for the first step in the method, the force field parameters, a time-reversible and volume conserving mapping $\Psi_\tau$, and a constant angle $\phi$, where $0<\phi\leq\pi/2$.

11. A method according to claim 1, including the step of displaying the results on a screen or printout.

12. A method of molecular simulation of a system over time comprising:
modelling the system using an atomistic model;
carrying out the method of simulating behaviour of a thermodynamic system according to any of the preceding claims; and
analysing the results obtained from the simulation and relating them to macroscopic level properties.

13. A method according to claim 12, further comprising using the relationship of the results to the macroscopic properties to assess and optionally modify the system at the macroscopic level, before repeating the method on the modified system.

14. An apparatus which simulates behaviour of a thermodynamic system over time, the thermodynamic system having potential energy that can be split into more quickly varying parts and more slowly varying parts and having a state described by collective vectors of position and momentum at any given time, the apparatus comprising a momentum refreshment processor, a conservative dynamics processor, and an acceptance/rejection processor, wherein the momentum refreshment processor mixing the collective momentum vector with a noise vector;

the conservative dynamics processor applying a mollified impulse multiple time stepping conservative dynamics method to a current state, in which calculations for forces corresponding to more slowly varying energy parts in the thermodynamic system undergo an averaging procedure and are carried out at a larger time step than calculations for forces corresponding to more quickly varying energy parts; and wherein the acceptance/rejection processor accepting a current state or returning a replacement state based on the system.

15. A non-transitory tangible computer-readable medium storing a computer program which, when executed on a processor, carries out a computer-implemented method of simulating behaviour of a thermodynamic system over time, the thermodynamic system having potential energy that can be split into more quickly varying parts and more slowly varying parts and having a state described by collective vectors of position and momentum at any given time, the method comprising a momentum refreshment process, a conservative dynamics process, and an acceptance/rejection process, wherein the momentum refreshment process comprises mixing the collective momentum vector with a noise vector;

the conservative dynamics process comprises applying a mollified impulse multiple time stepping conservative dynamics method to a current state, in which process calculations for forces corresponding to more slowly varying energy parts in the thermodynamic system undergo an averaging procedure and are carried out at a larger time step than calculations for forces corresponding to more quickly varying energy parts; and wherein the acceptance/rejection process is based on the system energy and comprises accepting a current state or returning a replacement state.

* * * * *

UNITED STATES PATENT AND TRADEMARK OFFICE
CERTIFICATE OF CORRECTION

PATENT NO. : 8,589,127 B2  
APPLICATION NO. : 12/823590  
DATED : November 19, 2013  
INVENTOR(S) : Elena Vitalievna Akhmatskaya et al.

Page 1 of 1

It is certified that error appears in the above-identified patent and that said Letters Patent is hereby corrected as shown below:

On the Title Page, In Column 1 (Inventors), Line 3, Delete "Schielowsee (DE)" and insert -- Schwielowsee (DE) --, therefor.

In the Claims

In Column 19, Line 54, In Claim 6, delete "$\overline{\Omega}_i = (\Gamma_i^T, t_i^T,$" and insert -- $\overline{\Omega}_i = (\Gamma_i^T, t_i)^T,$ --, therefor.

In Column 20, Line 20, In Claim 7, delete "$\delta_x$," and insert -- $\delta_x$ --, therefor.

Signed and Sealed this  
Twenty-fifth Day of March, 2014

Michelle K. Lee  
*Deputy Director of the United States Patent and Trademark Office*